United States Patent
Braun et al.

(12)

(10) Patent No.: US 6,286,466 B1
(45) Date of Patent: Sep. 11, 2001

(54) INTERNAL-COMBUSTION ENGINE

(75) Inventors: Tillman Braun, Berglen; Uwe Gaertner; Klaus-J. Marquardt, both of Remshalden, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/267,692

(22) Filed: Mar. 15, 1999

(30) Foreign Application Priority Data

Mar. 13, 1998 (DE) ................................................ 198 10 933

(51) Int. Cl.[7] .................................................... F02B 69/06
(52) U.S. Cl. ................................................ 123/21; 123/64
(58) Field of Search ............................. 123/21, 64, 673, 123/90.11

(56) References Cited

U.S. PATENT DOCUMENTS

| 4,429,669 | * | 2/1984 | Burley ..................................... 123/64 |
| 4,700,684 | * | 10/1987 | Pischinger et al. .................... 123/21 |
| 5,005,539 | * | 4/1991 | Kawamura .............................. 123/21 |
| 5,007,382 | * | 4/1991 | Kawamura .............................. 123/21 |
| 5,022,353 | * | 6/1991 | Kawamura .............................. 123/21 |
| 5,036,801 | * | 8/1991 | Imajou .................................... 123/21 |
| 5,930,992 | * | 8/1999 | Each et al. ........................ 123/90.11 |
| 6,073,596 | * | 6/2000 | Kemper .............................. 123/90.11 |

FOREIGN PATENT DOCUMENTS 33 17 128 A1    8/1984   (DE) .
196 31 799 A1   1/1997   (DE) .

* cited by examiner

*Primary Examiner*—John Kwon
(74) *Attorney, Agent, or Firm*—Crowell & Moring LLP

(57) ABSTRACT

A piston internal-combustion engine has a control system for controlling the number of strokes of the combustion process taking place inside a combustion space. As a function of operating parameters, the control system controls the engine operating process such that the process has a variable cycle of at least four strokes. A pushing of a charge out of a combustion space of the piston internal-combustion engine does not take place before one or several operating parameters have reached one defined limit value, respectively.

6 Claims, 3 Drawing Sheets

INTERNAL-COMBUSTION ENGINE

BACKGROUND OF THE INVENTION

The present invention relates to a piston internal-combustion engine having a control system for controlling the stroke sequence of the engine-operating process as a function of operating parameters, and to a process for controlling and automatically controlling the operating mode of a piston internal-combustion with a variable sequence of strokes as a function of operating parameters.

DE-A-196 31 799 describes a piston internal-combustion engine and a process in which a piston internal-combustion engine has six working strokes and a variable valve timing is operated by four strokes-during a warm-up phase and by six strokes after the operating temperature has been reached. The number of strokes can only be varied between a four and six stroke operation, with a pushing of the combustion products out of the combustion space of the cylinder in all cases taking place during the fourth stroke. The fifth stroke is a working stroke. At its start, water is sprayed into the cylinder in order to generate water vapor in the cylinder which is still hot from the preceding combustion. The pressure of this water vapor moves the piston further along. The sixth stroke is used for pushing out the water vapor.

DE-A 33 17 128 discloses an internal-combustion engine having a six-stroke cycle, in which the push-out stroke for pushing out the combustion products is always the sixth stroke.

Both known concepts have in common that the number of strokes of the internal-combustion engine is either fixed from the beginning or can be varied between only two values. The combustion products are pushed out of the cylinder no later than during the sixth stroke, irrespective of whether they still contain combustible parts or residual oxygen or not. As a result, a portion of the energy which can still be utilized in the cylinder is lost. Because power losses occur with each charge cycle as the result of valve movements and flows, premature charge cycles have a negative effect on the efficiency of the internal-combustion engine.

Modern directly injecting NFZ diesel engines reach an efficiency which is comparatively high for internal-combustion engines with effective efficiencies of up to 45% in the full-load range. In the partial load range, the efficiency is reduced to values of about 30% and below. This is the result of the lower pressure level and temperature level of the combustion, the high charge cycle losses caused by the pressure gradient from the exhaust gas side to the intake side and the high proportion of mechanical losses. Because internal-combustion engines in vehicles are operated in the partial load range for a considerable portion of their operation, this represents a serious disadvantage.

Measures which endeavor to obtain an improvement of the internal efficiency by raising the internal-combustion pressure level and the temperature level, however, result in a rise of the nitrogen oxide ($NO_x$) emissions. Furthermore, the capability to be mechanically and thermally stressed with respect to the peak pressure and the internal-combustion temperature in the full-load operation represents the limit for the above-mentioned measures furthering the partial load operation.

SUMMARY OF THE INVENTION

An object of the present invention is to increase the efficiency of piston internal-combustion engines, particularly in the partial-load range, and in the process minimize the pollutant emissions.

With respect to the piston internal-combustion engine, this object has been achieved by providing that a control system is provided which controls the stroke sequence of the engine-operating process such that the process has a variable cycle of at least four strokes, and in that devices are provided so that a pushing of a charge out of a combustion space of the piston internal-combustion engine does not take place before at least one operating parameter has reached a limit value defined therefor it, the engine-operating process takes place in a variable cycle of at least four strokes, and the sequence of strokes is varied such that a pushing of a charge out of the combustion space of the piston internal-combustion engine does not take place before at least one operating parameter has reached a limit value defined therefor.

These measures have the advantageous effect that the number of charge cycles per n working strokes is reduced, resulting in the lowering of the charge cycle losses mainly in those ranges of the characteristic diagram in which a negative pressure gradient (charge pressure<exhaust gas counterpressure) exists in the four-stroke operation. If, for example, the pushing-out does not take place before the eighth stroke, the air flow rate will be reduced by approximately half and, together with it, the charge cycle work will be reduced by approximately the same amount. Since, instead of being operated once per two crankshaft. rotations in the four-stroke operation, each valve is operated only once per four crankshaft rotations in the eight-stroke operation, the power to be applied for this purpose is also reduced by 50%. A special advantage achieved with the present invention in contrast to the prior art is the fact that the number and sequence of the strokes, starting from the fourth stroke, are flexibly adapted to the momentary operating conditions of the internal-combustion engine.

Assuming the existence of the same emission concentrations, the lowering of the exhaust gas flow rate leads to the reduction of the pollutant emission. The renewed compression(s) and combustion(s) of the hot exhaust gas, the combustion temperature and the ignition pressure are at a higher level, and thus the HC emissions in the exhaust gas are lowered. The exhaust gas which occurs and remains in the combustion space during the first combustion and during all following combustions compensates the formation of $NO_x$ which increases because of higher process temperatures because the mechanisms are in effect which are known from the exhaust gas recirculation.

The lower spark gaps also have a positive effect on the vibration behavior and the generation of noise of the internal-combustion engine.

A particularly advantageous further feature of the present invention involves the fact that a control system is provided which controls the intake and exhaust valves of the internal-combustion engine such that a charge will not be pushed out of the combustion space and the exhaust valve will not be opened up before the air-fuel ratio $\lambda$ existing in the combustion space has reached a lower limit value $\lambda_{limit}$. Therefore, during the overstoichiometric combustion, the residual oxygen not yet used for a combustion can be used for further working strokes. The reason is that, after its first combustion, the air-exhaust gas mixture passes through further combustion cycles and, in this operating mode, the charge cycle takes place at the earliest during the sixth stroke, and depending on the amount of air excess, also later. During an acceleration operation, the increased mixture quantity can already be charged one crankshaft rotation after the preceding combustion stroke, so that the response behavior of the engine will increase in the transient operation.

A charge cycle as a function of the air-fuel ratio λ is advantageous particularly in the case of diesel and Otto direct-injection lean-mixture engines. In the case of diesel engines, the air-fuel ratio λ changes over the load range. In the full-load range, values of λ=1.2 are reached, while, in the lower partial load range, the mixture is made lean to λ=3 to λ=7. At λ=3, the exhaust gas contains a residual oxygen amount which would be sufficient for one additional combustion operation at λ=7, for example, it would even be sufficient for four additional combustion operations.

When the engines are charged, the higher exhaust gas temperature also has an advantageous effect on the charge pressure buildup because, relative to the carried-through mass, the energy available at the exhaust gas turbocharger turbine is higher than in the case of the four-stroke process with a correspondingly lower exhaust gas temperature.

According to another advantageous further aspect of the invention, the internal-combustion engine has exhaust gas after-treatment systems, such as an SCR $NO_x$ v removal system, particle filters or an oxidation catalyst. The temperature increase occurring in the process according to the present invention is also advantageous because higher temperatures are more favorable for the conversion action of catalysts. As the result of the higher operating temperatures, a faster response can also be expected after a cold start.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
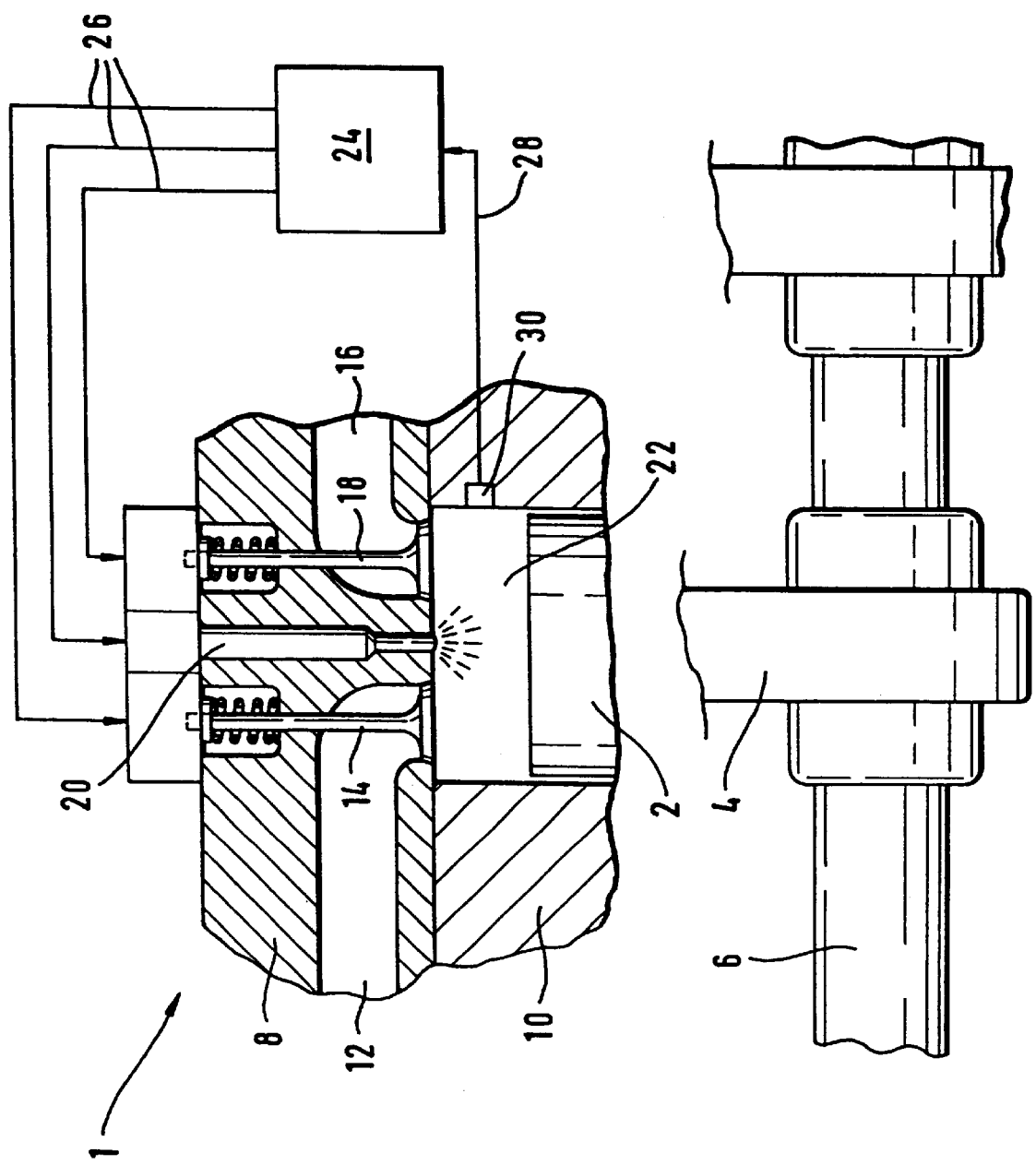
FIG. 1 is a schematic view of a currently preferred embodiment of a piston internal-combustion engine according to the present invention.

The piston internal-combustion engine illustrated as a partial sectional view in FIG. 1 is preferably a diesel engine 1, of which only the relevant portion is shown. The diesel engine 1 has a crankshaft drive which consists of a piston 2, a connecting rod 4 and a crankshaft 6. The crankshaft drive is disposed in a case 10 which is partially shown. The piston 2 slides back and forth inside the cylinder block and the crankcase 10. The connecting rod 4 transmits this movement to the crankshaft 6, whereby the back-and-forth movement of the piston 2 is converted to a rotating movement of the crankshaft 6.

The fresh air required for the combustion flows through an intake port 12 arranged in the cylinder head 8. The cylinder-side end of the intake port 12 is closable by an intake valve 14 with respect to the combustion space 22. The burnt exhaust gases flow out of the combustion space 22 through an exhaust port 16 arranged in the cylinder head 8. The exhaust port 16 can be closed off on its cylinder-side end by an exhaust valve 18 with respect to the combustion space 22.

The intake valve 14 and the exhaust valve 18 are preferably electrically operable solenoid valves. Additional operating forms, such as hydraulic forms, are also contemplated as within the scope of the present invention.

The diesel fuel required for the combustion is injected into the combustion space 22 by way of an injection nozzle 20. The combustion of the fuel-air mixture takes place in a combustion space 22 which is bounded by the interior circumferential wall of the cylinder block and the crankcase 10, the surface of the piston 2, the cylinder head 8 as well as the intake and exhaust valves 16, 18 arranged therein.

The diesel engine 1 illustrated in FIG. 1 has a control system 24 for controlling the timing sequence of the engine-operating process which, on the output side, controls the intake valve 14, the exhaust valve 18 and the injection nozzle 20 by way of electric lines 26. On the input side, the control system 24 is connected by way of an electric line 28 with a lambda sensor 30 for measuring the momentary or instantaneous air fuel ratio $\lambda_{actual}$ in the combustion space 22.

The control of the timing sequence according to the invention is as follows. The control system 24 controls the timing sequence of the engine-operating process as a function of operating parameters. The intake valve 14, the exhaust valve 18 and the injection nozzle 20 are controlled such that the engine-operating process has a cycle of at least four strokes, and a pushing-out of a charge from the combustion space 22 will not take place or the exhaust valve 18 will not be opened up before at least one operating parameter has reached a defined limit value.

According to the currently preferred embodiment, the engine-operating process is automatically controlled as a function of the air-fuel ratio $\lambda_{actual}$ momentarily existing in the combustion space 22. The control system 24 will not open the exhaust valve 18 and a charge cycle will not take place before the air-fuel ratio $\lambda_{actual}$ momentarily existing in the combustion space 22 has reached a lower limit value $\lambda_{limit}$. Thereby, during an overstoichiometric combustion, the residual oxygen not yet used for a combustion can be used for additional working strokes. The momentary air-fuel ratio $\lambda_{actual}$ in the combustion space 22 is measured directly by the lambda sensor 30, and the measured value is transmitted by way of the electric line 28 to the control system 24.

As a function of the momentary air-fuel ratio $\lambda_{actual}$ in the combustion space 22, the timing sequence of the engine-operating process automatically controlled by the control system 24 is as follows:

1) The timing sequence starts with an intake stroke during which the intake valve 14 is opened and fresh air is taken into the combustion space 22.

2) A compression stroke follows during which the taken-in air is compressed.

3) A first working stroke follows, during which fuel is injected and the fuel-air mixture is ignited.

4) Another compression stroke follows during which the combustion products and the still existing residual oxygen are compressed.

5) Another working stroke follows, during which a defined amount of fuel is injected and the mixture of fuel, residual oxygen and combustion products is ignited. After the ignition, the lambda sensor 30 measures the momentary air-fuel ratio $\lambda_{actual}$ in the combustion space 22, and the control system 24 compares the measured value with the stored limit value $\lambda_{limit}$. If a sufficient amount of residual oxygen is present for another combustion operation, points 4) and 5) will be repeated.

6) Only if the condition $\lambda_{actual}=\lambda_{limit}$ has been met, push-out stroke will immediately follow, during which the completely burnt combustion products are pushed out through the open exhaust valve 18.

The above-described cycle will then start again from the beginning. In this case, however the number and sequence of the strokes depend on whether the diesel engine 1 continues to be operated in a partial-load operation with a high air-fuel ratio λ or in a full-load range with a low air-fuel ratio λ. In order to ensure a sufficient interval to the soot formation, the lower limit value $\lambda_{limit}$ must be selected correspondingly.

Figure 2:
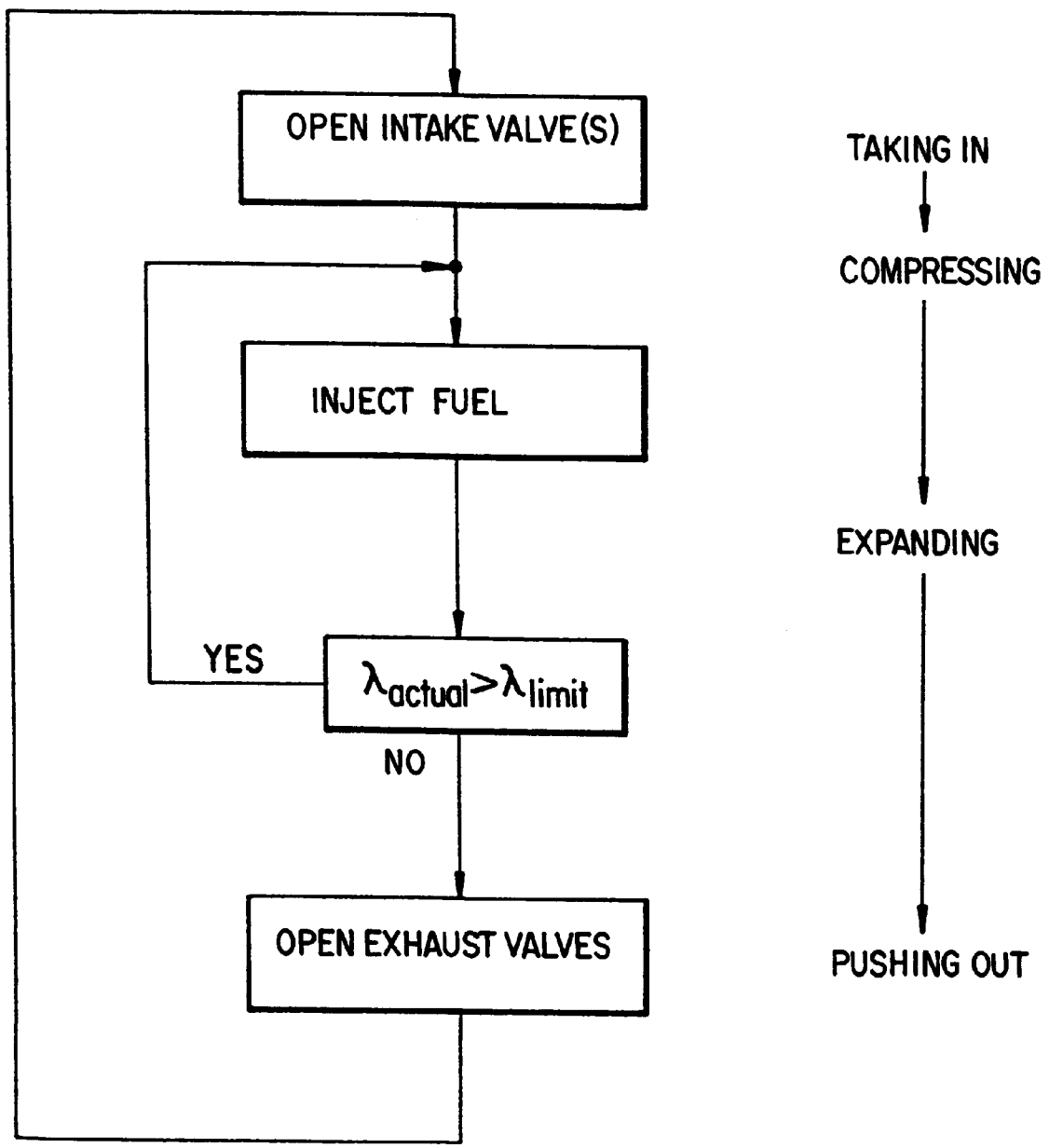
FIG. 2 is a flow chart which shows the control of the stroke sequence of a piston internal-combustion engine as a function of the air-fuel ratio λ.

FIG. 2 is a flow chart in which particularly the openings of the intake and exhaust valves 14, 18 within the cycle are taken into account. After fresh air has been taken into the combustion space 22 through the open intake valve 14, this intake valve 14 will close. Then, along the inner loop of the flow chart of FIG. 2, injection operations, compression and working strokes (expanding) will take place until the condition $\lambda_{actual}=\lambda_{limit}$ has been met. Only then will the exhaust valve 18 be opened up for the charge cycle, and another cycle will start, in which there is a passing through the outer loop. The cycle which follows does not necessarily have the same number of strokes and the same stroke sequence since these parameters depend on the air-fuel ratio λ which may have changed in the interim.

According to the present invention, not only the stroke sequence is a function of the operating parameters but also the quantity and the pressure of the injected fuel as well as the injection duration and the point in time of the injection. The quantity of the injected fuel can therefore decrease continuously from one working stroke to the next, or fuel is injected only before the first working stroke and then no more until the charge cycle. In order to permit a variability which is as high as possible with respect to the injection point in time, the injection pressure and the injection duration, the diesel engine 1 has an injection system which preferably operates according to the known common-rail system.

Figure 3:
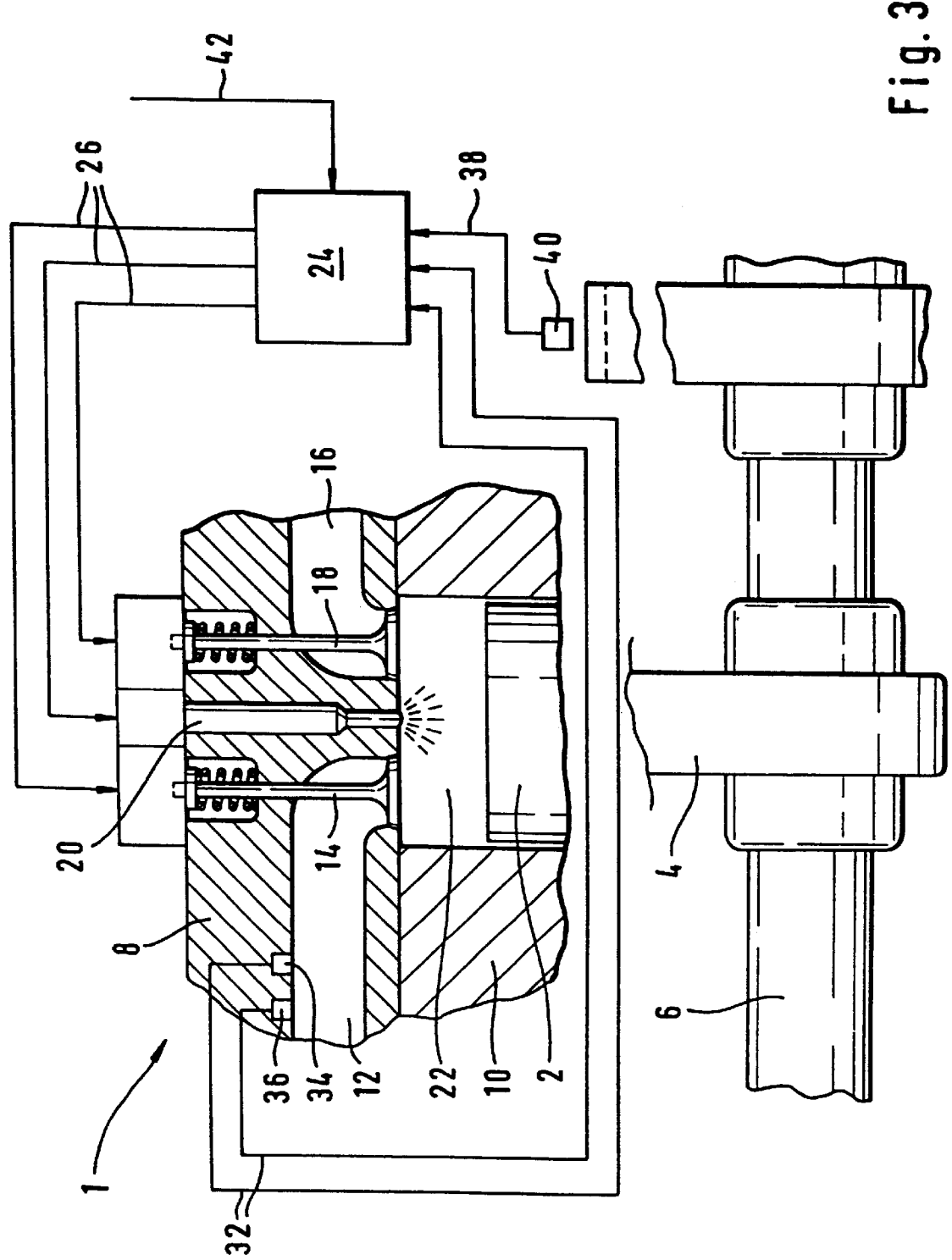
FIG. 3 is a schematic view of another embodiment of a piston internal-combustion engine according to the present invention.

FIG. 3 shows another embodiment of the piston internal-combustion engine, the reference numbers for the same structural elements being the same as in FIG. 1. In this further embodiment, the air-fuel ratio λ is calculated indirectly by way of measured auxiliary quantities. On the input side, the control system 24 is connected by electric lines 32 with a sensor 34 for measuring the air pressure and with a sensor 36 for measuring the air temperature. In addition, an electric line 38 connects a sensor 40 for measuring the rotational speed of the crankshaft 6 with an input of the control system 24.

Furthermore, an electric line 42 communicates the control system 34 with a part of the engine electronic system in which the characteristic control diagrams of the diesel engine 1 are stored. The sensors 34, 36, 40 measure the rotational crankshaft speed, the pressure and the temperature of the air current flowing through the intake port 12, and electric signals, which are proportional to the measured quantities, are transmitted to the automatic control system 24 by the lines 32, 38, for conversion to digital signals.

The control system 24 contains a computer unit which computes from the measured signals a value for the air flow which was taken into the combustion space. On the other side, the fuel flow injected into the combustion space 22 is read out of the characteristic diagram of the engine electronic system and, by way of the electric line 42, is read into the computer unit of the control system 24 which computes from the air flow and the injected fuel flow, as the final result, a value for the air-fuel ratio λ. The control of the engine operating process as a function of the air-fuel ratio λ takes place analogously with the above-described process control of the preferred embodiment. Preferably, the control system 24 according to the present invention is separated from the remaining engine electronic system, but it may also form a unit together with the engine electronic system.

Preferably, the diesel engine has a system for an exhaust gas aftertreatment, such as an oxidation catalyst, which is not shown in FIG. 1.

Instead of being controlled by the air-fuel ratio λ, the stroke sequence of the piston internal-combustion engine 1 can also be controlled by the rotational engine speed and/or the engine load, in which case, the number of injection operations per n engine rotations, for example, may be deposited in the form of characteristic diagrams in the automatic control device 24. For example, the present invention is also applicable but direct-injection Otto engines and the like which can also be operated according to the above-described engine operating process.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A piston internal-combustion engine, comprising a control system for controlling a stroke sequence of an engine-operating process as a function of engine operating parameters, the process has a variable cycle of at least four strokes, and devices operatively arranged to prevent a pushing of a charge out of a combustion space of the piston internal-combustion engine before at least one operating parameter has reached a limit value defined therefor wherein at least one intake valve, at least one exhaust valve and at least one injection nozzle per cylinder are provided and are configured so as to be controlled by the control system via electric signals and comprising a control system for controlling a stroke sequence of an engine-operating process as a function of engine operating parameters, the process has a variable cycle of at least four strokes, and devices operatively arranged to prevent a pushing of a charge out of a combustion space of the piston internal-combustion engine before at least one operating parameter has reached a limit value defined therefor a sensor is operatively connected to the control system for sensing air-fuel ratio in the combustion space, whereby, as a function of the sensed ratio the number and sequence of the strokes of the engine-operating process is automatically controllable.

2. Process, for controlling an engine-operating process of a piston internal-combustion engine with a variable sequence of strokes as a function of operating parameters, comprising the steps of having the engine-operating process take place in a variable cycle of at least four strokes, and varying the sequence of strokes wherein the sequence includes the steps of:
   (1) taking in one fresh air and a fuel-air mixture into the combustion space after an intake valve has been opened previously;
   (2) compressing the previously taken-in fresh air or the taken-in fuel-air mixture;
   (3) optionally injecting fuel and igniting the fuel-air mixture;
   (4) again compressing the completely or partially burnt charge which remains completely in the combustion space;
   (5) optionally injecting fuel and igniting the charge;
   (6) pushing out the charge after an exhaust valve has been opened previously when the operating parameter has reached the limit value defined therefor;

(7) as long as defined limit value has not been reached, further compressing, injecting and igniting according to above steps and until the operating parameter has reached the defined limit value therefor it; and (8) pushing out the charge after the exhaust valve (18) has been opened previously, and the air-fuel ratio present in the combustion space is measured and the charge is not pushed out of the combustion space before the air-fuel ratio present in the combustion space has reached a lower limit value so that, during an overstoichiometric combustion, residual oxygen not yet used for combustion is usable for additional working strokes.

3. The process according to claim 2, wherein the fuel quantity injected through the injection nozzle is variable by the control system as a function of the operating parameter for each of the working strokes within a cycle.

4. The process according to claim 2, wherein a value for the fuel flow injected or taken into the combustion space is read into the control system, and the computer unit computes the value for the air-fuel ratio ($\lambda$) from the read value and the air flow value.

5. For controlling an engine-operating process of a piston internal-combustion engine with a variable sequence of strokes as a function of operating parameters, comprising the steps of having the engine-operating process take place in a variable cycle of at least four strokes, and varying the sequence of strokes wherein the sequence includes the steps of:

(1) taking in one fresh air and a fuel-air mixture into the combustion space after an intake valve has been opened previously;

(2) compressing the previously taken-in fresh air or the taken-in fuel-air mixture;

(3) optionally injecting fuel and igniting the fuel-air mixture;

(4) again compressing the completely or partially burnt charge which remains completely in the combustion space;

(5) optionally injecting fuel and igniting the charge;

(6) pushing out the charge after an exhaust valve has been opened previously when the operating parameter has reached the limit value defined therefor;

(7) as long as defined limit value has not been reached, further compressing, injecting and igniting according to above steps and until the operating parameter has reached the defined limit value therefor it; and (8) pushing out the charge after the exhaust valve (18) has been opened previously, and the fuel quantity injected through the injection nozzle can be varied by the control system as a function of the operating parameter for each of the working strokes within a cycle.

6. The process according to claim 5, wherein a value for the fuel flow injected or taken into the combustion space is read into the control system, and the computer unit computes the value for the air-fuel ratio ($\lambda$) from the read value and the air flow value.

* * * * *